United States Patent [19]

Hoagland

[11] 4,277,338
[45] Jul. 7, 1981

[54] FILTER ASSEMBLY

[75] Inventor: John C. Hoagland, Longmeadow, Mass.

[73] Assignee: Monsanto Company, St. Louis, Mo.

[21] Appl. No.: 101,023

[22] Filed: Dec. 6, 1979

[51] Int. Cl.³ .................... B01D 27/08; B01D 29/02; B01D 35/18; F16L 17/00
[52] U.S. Cl. ................................ 210/186; 210/351; 210/447; 210/450; 425/199; 425/379 R; 285/41; 285/95; 285/351
[58] Field of Search ............... 210/184, 186, 351, 398, 210/446, 447, 450, 451, 453, 445; 425/197, 198, 199, 378 R, 379 R; 285/41, 109, 110, 111, 95, 351

[56] References Cited

U.S. PATENT DOCUMENTS

| | | | |
|---|---|---|---|
| 3,038,201 | 6/1962 | Harkenrider | 425/197 X |
| 3,428,340 | 2/1969 | Pelton | 285/95 |
| 3,675,934 | 7/1972 | Heston | 210/447 X |
| 3,895,833 | 7/1975 | Thiessen | 285/111 X |

OTHER PUBLICATIONS

"Facet Continuous-Flow Filtration Systems and Process Plug Valves," Bulletin FPD-900.1, Facet Enterprises, Madison Heights, MI, 4/1/79.

Primary Examiner—Charles N. Hart
Assistant Examiner—David R. Sadowski
Attorney, Agent, or Firm—David Bennett; William J. Farrington; Edward P. Grattan

[57] ABSTRACT

A filter assembly for extruded polymer melts is described which comprises a filter having retained between inlet and outlet manifolds with a contact pressure that can be varied. A primary seal device between the manifold and the housing is located in a rabbet in either the housing or the manifold at the contact plane. This seal responds to pressure from the polymer melt flow by deforming and increasing the contact pressure between the manifold and the housing. Thus the greater the pressure at which the melt is extruded, the tighter is the seal.

5 Claims, 6 Drawing Figures

FILTER ASSEMBLY

BACKGROUND OF THE INVENTION

This invention relates to filter assembly with particular utility in the filtration of viscous polymer melts in which high shear forces are encountered.

A thermoplastic polymer is very often formed into a finished or semi-finished state by an extrusion process in which a polymer, and optionally other ingredients to be incorporated therein, is subjected to a compounding operation before being extruded through an orifice of suitable dimensions into a mold or into the air in the form of a sheet or strand.

Where it is required that the polymer be of a particularly high quality it is usually necessary to pass the extruded melt through a filter to remove gel particles, solid impurities from the polymer itself or the additives compounded therewith and burnt stock where local overheating may have led to partial decomposition of the polymer.

DISCUSSION OF THE PRIOR ART

The filters of the prior art commonly comprise filter element units which may be interposed in the path of the melt. When the filter loses efficiency the melt flow is often rerouted through another similar pod while the first is replaced or cleaned. Alternatively the pod is carried on a slide accommodating a plurality of such pods and when the time to change filters comes, the slide is moved rapidly to place a fresh filter in the path of the melt flow. This type is further refined by the provisions of preheater and cool-off stations on either side of the filtering stations so that the slide may have five or more such stations.

Unfortunately the first type is very difficult to design in such a way that the polymer path is as direct as possible. With a highly viscous polymer the differential strains engendered as it follows an angled path can be carried through to the final product and where this is a sheet requiring uniformity of dimensions to within narrow tolerances, the result can be unacceptable thickness, wrinkling or deformation on cooling.

The second type of filter utilizes a rapid pod change technique that causes a short interruption in polymer flow followed by release. The pressure pulse generated is often sufficient to dislodge tiny particles of burnt stock that have accumulated in dead spots in the polymer melt passages. Where these are upstream of the filter there is no real problem, but if they are downstream they pass through to contaminate the product.

An additional problem with the second type of filter change mechanism lies in the seal devices used to ensure retention of the polymer in the closed system during the change. Often the devices rely on pressured contact between machined metal surfaces. Thus when the pressure is released to allow a change of filter, a significant leak is created. It is largely to minimize this leak that the change is made rapidly.

GENERAL DESCRIPTION OF THE INVENTION

A filter assembly has now been devised that permits a slow change of filter pods with minimal losses of polymer melt.

The filter assembly of the invention also permits the polymer melt to flow in a constant direction with no signficant changes in its path.

The filter assembly of the invention can be changed without the generation of significant pressure variations likely to cause impurities to appear in the extruded polymer melt.

Another advantage of the filter assembly is the provision of effective seals that minimize losses of polymer during change of filter assemblies.

These and other advantages will become obvious in the following description of the filter assembly of the invention which comprises (A) a housing adapted to be interposed between opposed, aligned end surfaces of a polymer melt inlet manifold and a polymer melt outlet manifold;

(B) at least two filter pods, each containing a plurality of filter elements, the pods being retained within said housing in side-by-side relationship, and adapted to be moved successively into tight register with inlet and outlet manifolds to define alternate polymer melt flow paths and a plurality of intermediate polymer melt flow paths in which varying proportions of adjacent pods are utilized;

(C) a primary seal device, located in a rabbet at at least one of the interfaces of the inlet and outlet manifolds with the housing, and having a cross-section the outer surface of which is generally U-shaped, the dimensions of the device being such that (i) the convex surface of the device defines part of the polymer melt path, (ii) one outer surface of the member providing one leg of the U-shape bears against the wall of the rabbet, and (iii) the surface providing the other leg of the U-shape provides a sealing surface which bears against an opposed wall to form a seal between the housing and the manifold the tightness of which is determined in part by the pressure exerted in use by the melt flow on the convex surface of the device.

(D) means for achieving a controlled movement of the filter pods into successive exclusive register with the inlet and outlet manifolds; and (E) means connecting inlet and outlet manifolds adapted to urge the manifolds axially towards and away from each other so as to tighten the seal at the interfaces of the manifolds and the interposed housing. The use of controlled movement of the filter housing means that the changeover from one filter pod to the adjacent filter pod is gradual and little in the way of substantial pressure variations occurs. As a result the dislodging of burnt stock or other impurities from dead spots in the polymer melt flow path is substantially reduced.

It is usual to have just two adjacent filter pods within the housing but the invention described herein is not so limited, indeed three or more can be used. In practice however size constraints and the lack of any need to provide for any greater number, means that the housing usually accommodates only two filter pods.

The shape of the inlet and outlet manifold orifices is usually circulat for greatest flow efficiency and uniformity and therefore the filter pods, which should preferably have an identical diameter to the orifices of the manifolds to avoid pressure variations and to maintain streamlined flow so far as possible, have a cylindrical configuration. The filter elements contained within the pods can be any of those commercially available for polymer melt filtration but are most preferably provided by tubes with a porous outer surface. The pods are so constructed that to pass therethrough each portion of a polymer melt must pass through at least one of the filter elements.

The primary seal device that prevents leakage between the housing and the manifold can be located in a rabbet formed in the hosuing or the manifold at the respective contacting surfaces. Usually, if no secondary seal is provided, the rabbet is not formed in the manifold since, in such a configuration a portion of the device would, for a time during changing of the position of the housing, not bear against a suitable cooperating surface to effect a seal. The rabbet therefore in such configurations is usually formed in the housing and more preferably still at both ends of the housing so as to provide seals at the interfaces with both inlet and outlet manifolds. The pressure encountered at the inlet manifold end is somewhat greater than that at the other end of the housing such that a less efficient seal mechanism can, if desired, be employed.

The rabbet itself is adapted to accommodate the primary sealing device so as to seal off each filter pod against leaks at the interface and since these pods are most commonly cylindrical, the rabbet conveniently runs in a circumferential path around the polymer melt passage orifice in the housing or the manifold.

The primary seal device accommodated in the rabbet can be a simple ring with a U-shaped cross-section and of such dimensions that the legs of the U are equal in length to the depth of the rabbet and their separation is a little greater than the width of the rabbet such that one leg projects slightly beyond the supporting surface of the rabbet. The primary seal device may advantageously be provided with a retaining device that is adapted to locate it within the rabbet. Such a device can be for example an extension of the leg providing the sealing surface projecting into a circular groove in the housing.

The primary seal device has been described as having a configuration whose outer surface is generally U-shaped and it is understood that this embraces also a ring with a bow-shaped cross-section with the ends of the bow shaped to provide bearing surfaces. Such configurations can also be modified by extending one of the bearing surfaces to provide a retention means cooperating with a suitably shaped groove or slot in the rabbet, thus giving the cross-section the aspect of a cantilever construction.

It is often advantageous to provide a means for limiting the degree to which the convex surface of the primary sealing device can be deformed. This can for example be a stopper projection located within the rabbet between the legs of the device. Alternatively but less preferably it can be a modification of the retaining device described above adapted to limit the amount by which the leg providing the sealing surface can be splayed outward by appropriately configuring the leg extension and cooperating groove.

Often to facilitate replacement of the primary seal device the rabbet may also accommodate a split ring fixed to the housing and so shaped as to provide means for retaining the device loosely within the rabbet without limiting its ability to deform sufficiently to form an efficient seal.

To enhance the efficiency of the seal, the filter assembly is further provided with means connecting the inlet and outlet manifolds by which the manifolds can be urged in an axial direction towards and away from each another.

The connecting means can be tie rods or guide-rails disposed at at least two locations around the assembly to ensure that substantially even pressure is exerted at all parts of the contacting surfaces of the housing and manifolds when the manifolds are urged towards one another. The actuating force can be for example mechanical, hydraulic, electrical or magnetic in origin and should be capable of generating sufficient pressure between the contacting surfaces as to ensure, in cooperation with the seal device, substantial absence of leaks around the housing interfaces with the manifolds.

In use the connecting means are released just sufficiently to permit the controlled movement of the housing to bring one filter pod out of, and the adjacent filter pod into, alignment with the inlet and outlet manifolds. When the transfer is complete, the connecting means is activated to bring the pressure between the manifolds and the housing up to a level at which leaks are once again substantially precluded.

The connecting means are very often tie rods rigidly connected to the manifolds and provided with heating and optionally cooling mechanisms to cause expansion and contraction to the extent necessary to provide the necessary pressure adjustment at the contacting housing/manifold interfaces.

Alternative connecting means comprise guide rails upon which the manifolds are mounted and along which one or both of the manifolds can be moved by an appropriate actuating force that can be electrical, hydraulic or mechanical in origin.

Often the former arrangement is preferred since expansion/contraction forces are usually able to provide the very small movements required in a reproducible and easily controllable fashion at a much lower cost than the more obvious alternatives. The connecting means described herein has the considerable advantage that it permits a whole filter pod to be removed in its entirety for cleaning. This is often done by placing the pod in a furnace and burning out any retained organic material.

A further preferred feature of the present invention is the provision of a secondary seal between the housing and at least the inlet manifold. The secondary seal comprises a cantilever arm mounted on a body portion and preferably having means disposed in the body portion for raising or lowering the temperature of said body portion. The secondary seal is housed in a groove in one of the opposed faces of the housing and the manifold such that the cantilever arm bears against the opposed face. By preference the primary seal and secondary seal are not retained in the same face. Thus if the primary seal is located in a rabbet cut in the housing, the secondary seal is located in a groove in the opposed face of the manifold and vice versa.

Again it is preferred that secondary seals seal the gaps between the housing and both the inlet and outlet manifolds.

The cantilever arm is of such dimensions that it projects slightly beyond the groove that houses the device such that, when the inlet and outlet manifolds are brought into tight register with the housing, the cantilever member is depressed into the groove forming a tight seal. The tightness of the seal can be controlled by adjusting the temperature of the body portion of the second seal. Temperature variation is usually achieved by circulation of a fluid through a conduit in the body portion. Since the secondary seal does not require the cooperation of a polymer under substantial pressure, it is particularly effective at the beginning and the end of an extrusion run and during changes of position of the housing.

DESCRIPTION OF THE DRAWINGS

The attached drawings are illustrative of a preferred filter device according to the invention.

DESCRIPTION OF THE PREFERRED EMBODIMENTS

The invention is now more particularly described with reference to the above drawings which illustrate a preferred embodiment of the present invention. The drawings are not intended to imply any limitation on the scope of the invention and it is to be understood that minor variations on the location and detailed design of the features herein described are likewise considered to be within the purview of this invention.

Figure 1:
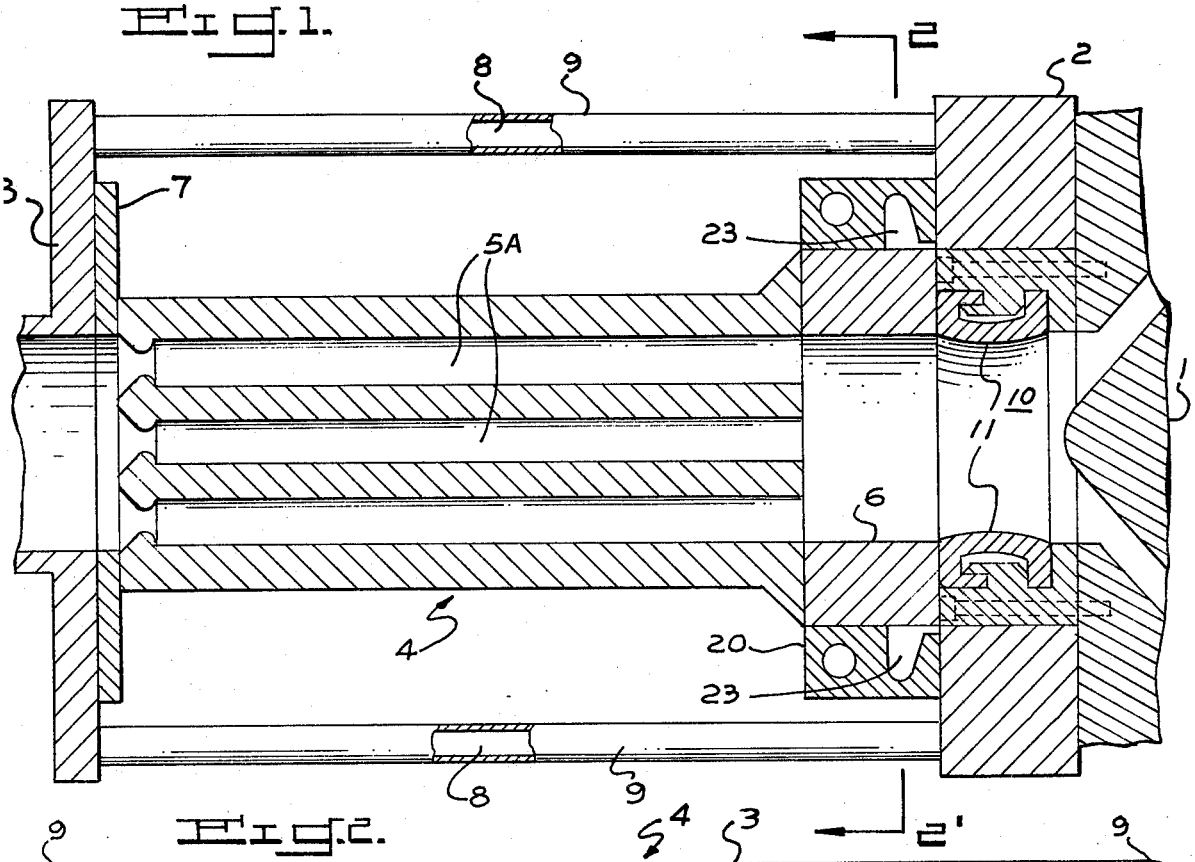
FIG. 1 is a simplified, vertical cross-section along the direction of extrusion showing the location of the primary and secondary seals and tie bars by which the tightness of the seal between the housing and the manifolds is controlled.
Figure 2:
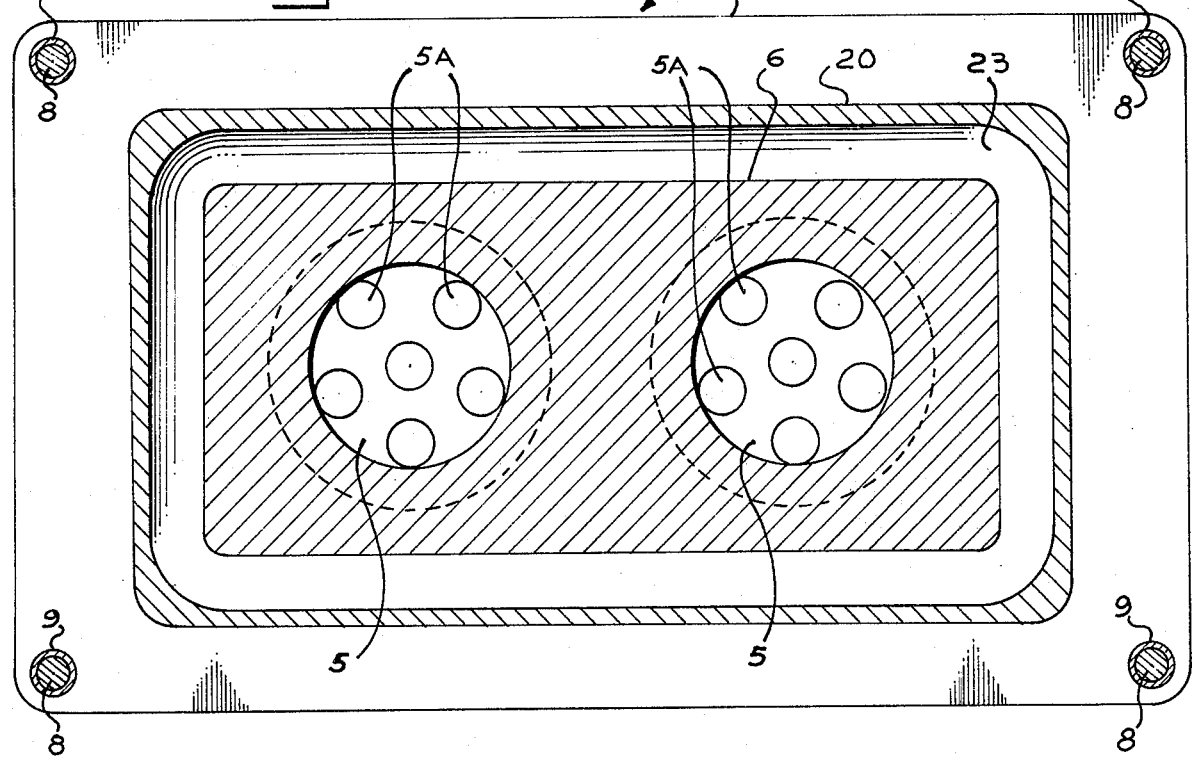
FIG. 2 is a cross-section of the device of FIG. 1 along line 2—2' showing the alternate filter pods and the location of the secondary seal device.

Referring now to FIGS. 1 and 2 of the drawings: an extruder, 1, communicates at its outlet end with a filter assembly comprising inlet and outlet manifolds, 2 and 3 respectively, and located between said manifolds, in adjustable register with both, a moveable filter housing, 4, enclosing two filter pods, 5, which comprise a plurality of filter elements, 5A. These elements cooperate, in use, to define a plurality of potential continuous passages for molten polymer from the extruder, through the inlet manifold; various combinations of filter elements according to the positioning of the housing with respect to the inlet manifold; and the outlet manifold in that order.

The housing, 4, comprises upstream and downstream platens, 6 and 7, which accommodate the ends of the filter pods, 5, and provide plane seal surfaces which, in use, are urged into hard contact with cooperating plane surfaces of the inlet and outlet manifolds by means of tie rods, 8. The tie rods are anchored in the inlet and outlet manifolds, 2 and 3 respectively, and are surrounded by heating jackets, 9, by which the rods can be expanded. Supplying heat to the rods causes an increase in the separation between the manifolds and thus reduces the contact pressure between the manifolds and the platens.

In use, one filter pod, 5, is placed in register with the polymer passage through the inlet manifold, 2, and the tie rods, 8, are cooled such that they contract and bring manifolds, 2 and 3, into tight register with platens, 6 and 7 respectively. Polymer flow through the filter assembly is then initiated.

When the time comes to change the filter, the temperature of the tie rods, 8, is increased by applying heat to the jackets, 9. The effect of this is to decrease the contact pressure between the surfaces of the manifolds and the platens and make it possible to effect a gradual movement of the housing, 4, (mechanism not shown) such that the alternate filter pod comes into register with the polymer passages in the manifolds. The transition is slow such that at intermediate points the polymer flow path may be defined by varying proportions of the filter elements in the adjacent filter pods. In this way the flow is not interrupted substantially and shock transitions are avoided.

After the transition has been completed the tie rods are cooled such that the platens and the manifolds are once again in tight register with one another.

In order to prevent or at least to minimize leakages during the transition, the filter assembly illustrated in FIGS. 1 and 2 is provided with primary and secondary seal devices, 10 and 20 respectively, designed to avoid leaks between the housing and the manifolds.

The primary seal, 10, is located in a rabbet in the inlet manifold surrounding the exit orifice of the passage through which the polymer flows. The seal construction is such that one arcuate surface, 11, provides an annular portion of the surface defining the passage through the manifold and another surface, 12, substantially at right angles to surface, 11, is in register with the upstream platen contacting the inlet manifold.

A secondary seal, 20, is located in a groove in the surface of the upstream platen contacting the inlet manifold. The groove completely circumscribes both of the filter pods such that the seal has the shape of a flattened anulus.

Figure 3:
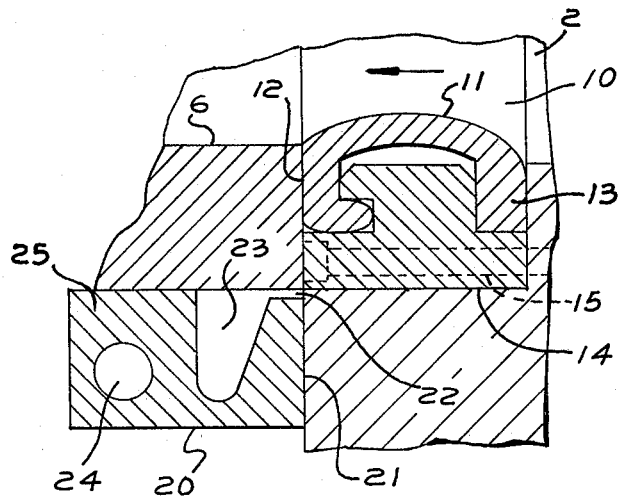
FIG. 3 is an enlarged view of part of FIG. 1 showing the construction of preferred primary and secondary sealing devices.

The primary and secondary seals are more particularly described in FIG. 3 which also indicates their spatial relationship in a preferred embodiment.

The primary seal, 10, is an annular device with an essentially U-shaped cross-section. In the embodiment shown in FIG. 3 the curved base of the cross-section provides part of the surface of the passage in the inlet manifold, 2, through which polymer passes to the filter pods. One leg of the U-shape, 13, bears against a wall of the rabbet in which the seal is located and the outer surface, 12, of the other leg bears against the opposed surface of the upstream platen, 6. The leg bearing against the platen is provided with an inturned extension which cooperates with a groove in a retaining member, 14, to anchor the primary seal in the groove. The retaining member is attached to the manifold by a screw, 15.

In use the pressure of the resin flow, (direction indicated by the arrow), tends to flatten the arcuate surface 11, of the primary seal. This flattening is translated into an increased pressure of surface, 12, against the surface of the platen in contact therewith.

The secondary seal is located in a groove in the platen and comprises a base portion, 25, with a cantilevered arm, 21, attached thereto. The arm extends towards the resin flow and is slightly shorter than the width of the groove so as to leave a narrow passageway, 22, communicating with a chamber, 23, between the arm, 21, and the base, 25, of the secondary seal. The cantilever arm extends slightly beyond the plane of the surface of the member in which it is accommodated such that when the platen and manifold are in contact it is slightly depressed.

In use any polymer escaping between the contacting platen and manifold surfaces must first get by the primary seal. This will normally be a very minor amount but when the housing is in transition the contact pressure between the surfaces is reduced and the primary seal is in part in register with the openings in the filter elements. This can allow some escape of polymer past the primary seal. In such event the polymer flows through the passage, 22, and accumulates under pressure in the chamber, 23. The pressure forces the cantilever arm, 21, outwards against the opposed surface of the manifold so increasing the contact pressure and therefore the tightness of the seal. Reduced effectiveness of the primary seal may also be observed at the start and at the end of an extrusion run.

The body of the secondary seal is usually provided with a passage, 24, for circulation of a heating fluid so as to ensure that any polymer collecting in the chamber, 23, does not solidify and interfere with the operation of the seal.

Figure 4:
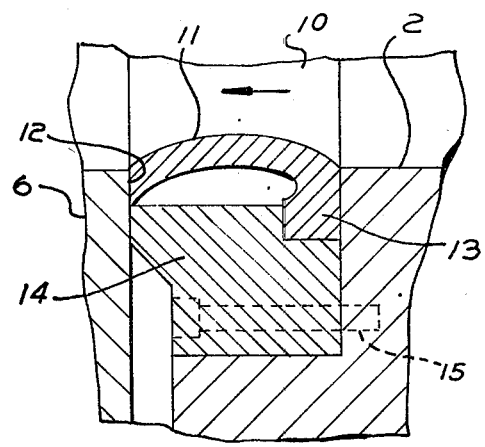
FIGS. 4, 5 and 6 are illustrations of alternative embodiments of the primary seal.
Figure 5:
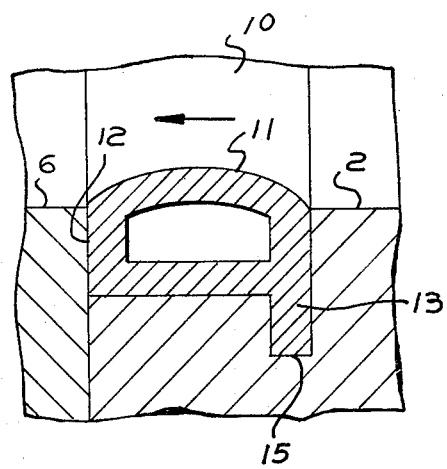
Figure 6:
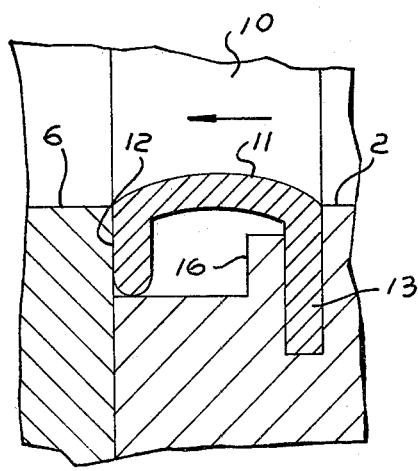

FIGS. 4, 5 and 6 illustrate alternative embodiments of the primary seal.

In FIG. 4 the U-shaped cross-section has been somewhat reduced by truncating the leg bearing against the opposed face of the platen and the retaining member, 14, bears directly on the leg, 13, so as to clamp the seal member in place.

In FIG. 5, the U-shaped cross-section has been modified by addition of a cross-member and by extending one leg into a cooperating groove, 15, to provide an anchor for the seal.

In FIG. 6, the rabbet is provided with a nib, 16, that retains one leg of the U-shaped seal member.

In each of the embodiments illustrated, the primary seal is located in a rabbet on the inlet manifold and surrounding the exit aperture of the passage through which the polymer melt is to flow. The seal essentially comprises an arcuate surface extending into the polymer flow path and upon which the polymer exerts a force tending to flatten the arcuate surface. The seal is constructed to respond to this pressure by deforming in such a way that a resultant movement in the direction of resin flow provides a sealing contact with the inlet manifold.

There are of course many potential variations and modifications of this invention besides the ones illustrated in the drawings. It is, for example possible, and indeed it is often desirable, to provide seals at the contact surfaces of the outlet manifold and the downstream platen as well as in the locations shown.

It is also intended that the heating jacket on the tie rolls could be replaced by an internal passage or by an electrical element. Other devices can also be designed to urge the manifolds into register with the housing with an adjustable contact pressure. This could be done for example by hydraulic means, by use of a screw device or by use of electrical power.

The housing illustrated comprises two filter pods but there is no reason more pods could not be included so as to extend the options available. The device can also be designed such that the "spent" filter pod can be removed after the transition is complete, for removal of any matter retained in the filter.

The embodiments illustrated show the primary seal located in the manifold and the secondary seal in the platen but as indicated above, this arrangement could be reversed. Indeed it is conceivable that both could be located on the same member though this is usually not a preferred configuration.

It is understood that these and other minor modifications are intended to be embraced within the purview of this invention.

What is claimed is:

1. A filter assembly which comprises
   (A) a housing interposed between opposed, aligned end surfaces of a polymer melt inlet manifold and a polymer melt outlet manifold;
   (B) at least two filter pods, each containing a plurality of filter elements, the pods being retained within said housing in side-by-side relationship, and adapted to be moved successively into tight register with inlet and outlet manifolds to define alternate polymer melt flow paths and a plurality of intermediate polymer melt flow paths in which varying proportions of adjacent pods are utilized;
   (C) a primary seal device, located in a rabbet at at least one of the interfaces of the inlet and outlet manifolds with the housing, and having a cross-section the outer surface of which is generally U-shaped, the dimensions of the device being such that
      (i) the convex surface of the device defines part of the polymer melt path,
      (ii) one outer surface of the member providing one leg of the U-shape bears against the wall of the rabbet, and
      (iii) the surface providing the other leg of the U-shape provides a sealing surface which bears against an opposed wall to form a seal between the housing and the manifold, the tightness of which is determined in part by the pressure exerted in use by the melt flow on the convex surface of the device,
   (D) means for achieving a controlled movement of the filter pods into successive exclusive register with the inlet and outlet manifolds; and
   (E) means connecting inlet and outlet manifolds adapted to urge the manifolds axially towards and away from each other so as to tighten the seal at the interfaces of the manifolds and the interposed housing.

2. A filter assembly according to claim 1 which additionally comprises a secondary seal device accommodated in a groove in one of the opposed faces of the housing and the inlet manifold, and comprising a cantilever arm and a body portion such that the body portion rests in the groove and the free end of the cantilever arm projects a little beyond the groove and into register with the opposed face so as to form a tight seal when the faces are brought together.

3. A filter assembly according to claim 2 in which a means disposed in the body of the secondary seal device is provided for varying the temperature of the secondary seal device.

4. A filter assembly according to any of claims 1 to 3 in which the inlet and outlet manifolds are rigidly connected by tie bars and are adapted to be moved axially towards and away from one another by expansion and contraction of said bars so as to increase and decrease the contact pressure between said manifolds and the housing.

5. A filter assembly according to any of claims 1 to 3 in which the housing is provided with means for moving the housing such that adjacent filter pods are moved successively, in gradual, controlled fashion, into tight register with the inlet and outlet manifolds to define alternate polymer melt flow paths.

* * * * *